United States Patent
Arai et al.

(10) Patent No.: US 7,931,706 B2
(45) Date of Patent: Apr. 26, 2011

(54) METHOD AND APPARATUS FOR FERMENTATION

(75) Inventors: Masayoshi Arai, Tokyo (JP); Tatsuro Watanabe, Mie-ken (JP); Akira Saito, Tokyo (JP); Sachio Nakazaki, Saitama-ken (JP); Toshihisa Maruta, Tokyo (JP); Hiroyuki Takano, Chiba-ken (JP)

(73) Assignee: Taiheiyo Cement Corporation, Tokyo (JP)

( * ) Notice: Subject to any disclaimer, the term of this patent is extended or adjusted under 35 U.S.C. 154(b) by 750 days.

(21) Appl. No.: 11/902,247

(22) Filed: Sep. 20, 2007

(65) Prior Publication Data

US 2008/0010899 A1 Jan. 17, 2008

Related U.S. Application Data

(62) Division of application No. 10/101,541, filed on Mar. 20, 2002, now Pat. No. 7,285,141.

(60) Provisional application No. 60/323,130, filed on Sep. 19, 2001.

(51) Int. Cl.
*C10L 5/00* (2006.01)
(52) U.S. Cl. ..... 44/629; 422/129; 435/283.1; 435/290.1
(58) Field of Classification Search ............... 435/283.1, 435/290.1; 422/129; 44/629
See application file for complete search history.

(56) References Cited

U.S. PATENT DOCUMENTS

| 2,042,497 | A | | 6/1936 | Bixler |
| 2,276,876 | A | | 3/1942 | Rietz |
| 2,851,792 | A | * | 9/1958 | Steimel et al. ............ 34/128 |
| 2,879,982 | A | * | 3/1959 | Paley .................... 432/69 |
| 4,203,376 | A | | 5/1980 | Hood |
| 5,047,349 | A | | 9/1991 | Eweson |
| 5,407,809 | A | | 4/1995 | Finn |
| 5,427,947 | A | | 6/1995 | Dalos |
| 5,716,013 | A | | 2/1998 | Benson et al. |

FOREIGN PATENT DOCUMENTS

| CA | 1108403 | | 9/1981 |
| JP | 52-097270 | A | 8/1977 |
| JP | 56-054293 | A | 5/1981 |
| JP | 07-033573 | A | 2/1995 |
| JP | 08-208363 | | 8/1996 |
| JP | 09-276824 | | 10/1997 |
| JP | 10-265284 | A | 10/1998 |
| JP | 2001-191059 | | 7/2001 |
| JP | 2001-191060 | | 7/2001 |

OTHER PUBLICATIONS

Office Action dated Jun. 11, 2010, in corresponding Japanese Patent Application No. 2000-252044, 5 pages, with English translation, 4 pages.
www.nishihara.co.jp/english/composting/composting.html 1950 (printed from website by examiner of prior application on Aug. 17, 2005).

* cited by examiner

*Primary Examiner* — Cephia D Toomer
(74) *Attorney, Agent, or Firm* — Foley & Lardner LLP

(57) ABSTRACT

A cement kiln from which its brick lining has been removed, or a rotary dryer for cement production is used as a fermentation treatment apparatus 202 for converting waste matter into compost. The waste matter to be subjected to the fermentation treatment includes city waste contained in garbage bags, and its fermentation treatment is carried out by introducing the waste matter directly into the aforesaid cement kiln or the aforesaid rotary dryer for cement production without tearing the aforesaid garbage bags.

4 Claims, 2 Drawing Sheets

METHOD AND APPARATUS FOR FERMENTATION

BACKGROUND OF THE INVENTION

1. Field of the Invention

This invention relates to a fermentation treatment process, a cement production process, a raw material/fuel for cement production, a fuel for electric power generation, a fermentation treatment apparatus, equipment for the manufacture of a raw material/fuel for cement production, and a cement plant.

2. Description of the Related Art

For a long time, the quantity of organic waste matter (e.g., garbage) to be disposed of has been steadily increasing, and many attempts have been made to develop a method for the effective disposal thereof and a method for the reuse thereof. As one method, it has been proposed to carry out the fermentation treatment (composting) of organic waste matter by means of a rotary fermenter.

On the other hand, the operational state of a cement plant varies according to the demand for cement. When cement is in low demand, the operation of some of the firing apparatus and other equipment may be stopper. Accordingly, their utilization has been a problem.

SUMMARY OF THE INVENTION

The present invention has been made in view of the above-described circumstances, and an object thereof is to provide a fermentation treatment process, a cement production process, a raw material/fuel for cement production, a fuel for electric power generation, a fermentation treatment apparatus, equipment for the manufacture of a raw material/fuel for cement production, and a cement plant, which permit some apparatus (e.g., cement kilns) installed in cement plants to be effectively utilized for the disposal of waste matter.

In order to accomplish the above object, the present invention provides a fermentation treatment process for the fermentation treatment of waste matter by use of a rotary kiln or a rotary dryer. This fermentation treatment process is characterized in that the waste matter to be subjected to the fermentation treatment includes city waste and/or other waste matter contained in garbage bags, and the process comprises the step of carrying out the fermentation treatment by introducing the waste matter directly into the aforesaid rotary kiln or the aforesaid rotary dryer without tearing the aforesaid garbage bags.

As used herein, the term "waste matter" means a concept including the following objects to be treated.

Organic sludge: Sewage sludge, sludge derived from human waste (septic tank sludge and waste water sludge in agricultural colonies), waste water sludge from the food industry, green algae, river and lake sludge, and the like are included in this category.

Food processing wastes: Beer cake, distilled spirit lees, bean-curd refuse (tofu refuse), sugar refining refuse, fruit juice lees, coffee grounds, tea grounds, stock raising refuse and the like are included in this category.

Forestry wastes and plant residues: Waste liquor from pulp mills, bark, sawdust, chip dust, trimmed branches and leaves, bagasses, rice husks, straw and the like are included in this category.

Living wastes: Garbage (kitchen refuse), combustible wastes collected in cities, wet refuse from business companies, and the like are included in this category.

Stock raising wastes: Livestock excreta, bird droppings and the like are included in this category.

Marine wastes: Fish intestines and bones, dead fishes and the like are included in this category.

The concept of waste matter also comprehends mixtures of two or more of the above-enumerated waste materials. Where a portion of the fermentation treatment product is returned and mixed with waste matter to be treated, as will be described later, such a mixture containing the fermentation treatment product is also referred to as "waste matter".

In the present invention, it is preferable to use a rotary kiln from which its brick lining has been removed, or a rotary dryer. This is advantageous, for example, in that the waste matter can be easily moved and the energy consumed for rotating the rotary kiln can be reduced. In the present invention, the rotary kiln preferably comprises a cement kiln, and the rotary dryer preferably comprises a rotary dryer for cement production.

Moreover, in order to improve the quality of the resulting fermentation treatment product, it is preferable to separate and remove foreign matter therefrom. During this separation and removal of foreign matter, it is preferable to crush the fermentation treatment product in one or more stages (primary crushing and secondary crushing). Its purpose is to adjust the fermentation treatment product to an appropriate particle size. Thereafter, the fermentation treatment product is preferably stored in a storage tank. After foreign matter is separated and removed from the resulting fermentation treatment product, the fermentation treatment product may be stored in a storage and fermentation treatment tank, where its fermentation is allowed to proceed further in the tank under aerobic conditions. In this case, the fermentation treatment product within the storage tank is preferably circulated therethrough. Thus, aerobic conditions can be maintained in the storage tank and the fermentation treatment product can be mixed and homogenized. In this case, it is preferable to circulate the fermentation treatment product by dividing and introducing the fermentation treatment product into a plurality of storage tanks, combining the fermentation treatment product portions withdrawn from the plurality of storage tanks, and dividing and introducing the combined fermentation treatment product again into the plurality of storage tanks. Thus, the resulting raw material/fuel for cement production can further be homogenized.

Furthermore, in the fermentation treatment process in accordance with the present invention, it is preferable to carry out the fermentation treatment of waste matter while introducing a portion of the resulting fermentation treatment product into the aforesaid rotary kiln or rotary dryer. This return of the fermentation treatment product to the raw material return is advantageous, for example, in that the quality of the fermentation treatment product can be stabilized.

In the above-described fermentation treatment process in accordance with the present invention, it is preferable to use waste heat generated in cement production in order to heat the air required for the fermentation treatment. This serves to reduce energy consumption. For the same purpose, it is preferable to use a part of the cooler exhaust resulting from cement production, either as a part of the air required for the fermentation treatment or as a heat source for preheating the air required for the fermentation treatment. Similarly, it is preferable to use waste heat generated in cement production in order to inactivate or destroy harmful microorganisms present in waste matter, the waste matter under fermentation treatment, or the resulting fermentation treatment product. Examples of such waste heat include exhaust gas from a kiln, and exhaust gas from a cooler.

On the other hand, it is preferable in the present invention that, in addition to the waste matter including city waste and other waste contained in garbage bags, sewage sludge be introduced as waste matter. This serves not only to achieve more efficient treatment of waste matter, but also to regulate the water content of the waste matter with the aid of water contained in the sewage sludge and thereby maintain a good fermentation condition.

In another aspect, the present invention comprises a cement production process. In this cement production process, the fermentation treatment product obtained by the above-described fermentation treatment process is used as a part of the raw material/fuel for cement production. In this case, it is preferable to introduce the resulting fermentation treatment product directly into any of the inlet ports of the preheater equipment and firing apparatus (e.g., cement kiln) which are used in the firing step of cement production. Thus, the process can be shortened without resorting to any special treatment. Moreover, it is preferable to introduce the gas produced in the fermentation treatment process into any of the inlet ports of the preheater equipment and firing apparatus (e.g., cement kiln) which are used in the firing step of cement production. This serves not only to deodorize such fermentation gas, but also to allow such fermentation gas to exhibit a denitrifying effect.

Thus, it may be said that, in still another aspect, the present invention comprises a raw material/fuel for cement production which is obtained by the above-described fermentation treatment process. As used herein, the term "raw material/fuel for cement production" means a concept including a raw material and a fuel which are used for purposes of cement production. However, when the term "raw material/fuel for cement production" is used, it may refer to only one of a raw material and a fuel.

In a further aspect, the present invention comprises a fuel for electric power generation which is obtained by the above-described fermentation treatment process. The fermentation treatment product obtained by the above-described fermentation treatment process has a high calorific value and can hence be used as a fuel for electric power generation.

In still a further aspect, the present invention comprises a fermentation treatment apparatus. This fermentation treatment apparatus is characterized in that a rotary kiln which is designed for purposes of high-temperature firing but from which its brick lining has been removed, or a rotary dryer is used for the fermentation treatment (composting) of waste matter. The rotary kiln preferably comprises a cement kiln, and the rotary dryer preferably comprises a rotary dryer for cement production.

In a preferred embodiment, at least a part of the outer surface of the aforesaid rotary kiln (e.g., cement kiln) or rotary dryer (e.g., rotary dryer for cement production), which is used as the fermentation treatment apparatus in accordance with the present invention, is covered with a heat insulating material so that the fermentation treatment may proceed uniformly and efficiently.

Where the fermentation treatment product is used as a raw material/fuel for cement production, the present invention is preferably embodied as a cement plant in which the above-described fermentation treatment apparatus is installed. Moreover, with consideration for piping and the like, it is preferable that the fermentation treatment apparatus be installed in the close vicinity of the firing apparatus of the cement production equipment. Thus, the exhaust gas produced in the fermentation treatment process can be easily introduced into the firing apparatus.

Moreover, the present invention may be embodied as equipment for the manufacture of a raw material/fuel for cement production including the above-described fermentation treatment apparatus. In a preferred embodiment, this equipment for the manufacture of a raw material/fuel for cement production includes a storage tank for the fermentation treatment product. In another embodiment, this equipment for the manufacture of a raw material/fuel for cement production includes a foreign matter separation/removal apparatus for removing foreign matter from the waste matter or the fermentation treatment product. This foreign matter separation/removal apparatus is usually installed on the upstream side of the fermentation treatment apparatus or on the upstream and downstream sides thereof. However, where sewage sludge, city waste or both of them are treated, it is more efficient to install the foreign matter separation/removal apparatus only on the downstream side of the fermentation treatment apparatus. In a preferred embodiment, this foreign matter separation/removal apparatus is constructed in such a way that plastics waste is also utilized as a raw material/fuel for cement production. Thus, all waste matter except metallic waste can be utilized as a raw material/fuel for cement production.

Moreover, in a preferred embodiment, this equipment for the manufacture of a raw material/fuel for cement production includes a means for supplying air to the fermentation treatment apparatus and a means for discharging exhaust gas therefrom, in order to maintain aerobic fermentation. Furthermore, in this equipment for the manufacture of a raw material/fuel for cement production, the aforesaid storage tank may be a storage and fermentation treatment tank. In this case, at least a part of the outer surface of the aforesaid storage tank is preferably covered with a heat insulating material. Preferably, this storage tank has a metering extractor installed at the bottom thereof so that the quantity of fermentation treatment product withdrawn therefrom may be controlled.

Furthermore, where the aforesaid storage tank is used as a storage and fermentation treatment tank in the aforesaid equipment for the manufacture of a raw material/fuel for cement production, it is preferable that the tank be equipped with an air supply means for supplying air thereto so as to promote aerobic fermentation. Moreover, in this equipment for the manufacture of a raw material/fuel for cement production, the aforesaid storage tank for the fermentation treatment product may be equipped with a means for returning a portion of the fermentation treatment product to the aforesaid fermentation treatment apparatus.

Furthermore, in the aforesaid equipment for the manufacture of a raw material/fuel for cement production, it is preferable that the storage tank be equipped with a circulation system for the fermentation treatment product so as to circulate the fermentation treatment product through the storage tank. Thus, aerobic conditions can be maintained in the storage tank and the fermentation treatment product can be mixed and homogenized. This circulation system is preferably constructed in such a way that the fermentation treatment product carried from the foreign matter separation/removal apparatus is divided and introduced into a plurality of storage tanks, the fermentation treatment product portions withdrawn from the plurality of storage tanks are combined, and the combined fermentation treatment product is divided and introduced again into the aforesaid plurality of storage tanks. Thus, the resulting raw material/fuel for cement production can further be homogenized.

The aforesaid foreign matter separation/removal apparatus preferably includes one or more apparatus for crushing the fermentation treatment product (e.g., a primary crusher and a secondary crusher). Thus, the fermentation treatment product can be adjusted to an appropriate particle size.

The present invention may also be embodied as a cement plant including the aforesaid equipment for the manufacture of a raw material/fuel for cement production.

As is obvious from the above description, the present invention provides a fermentation treatment process, a fermentation treatment apparatus, and equipment for the manufacture of a raw material/fuel for cement production, which permit idle apparatus (e.g., cement kilns) installed in cement plants to be effectively utilized for the disposal of waste matter, as well as a cement production process and a cement plant, which permit the production of cement and the composting treatment of waste matter to be carried out in an integrated manner.

DESCRIPTION OF THE PREFERRED EMBODIMENTS

Embodiments of the fermentation treatment process, cement production process, raw material/fuel for cement production, fuel for electric power generation, fermentation treatment apparatus, equipment for the manufacture of a raw material/fuel for cement production, and cement plant in accordance with the present invention will be described hereinbelow with reference to the accompanying drawings.

Figure 1:
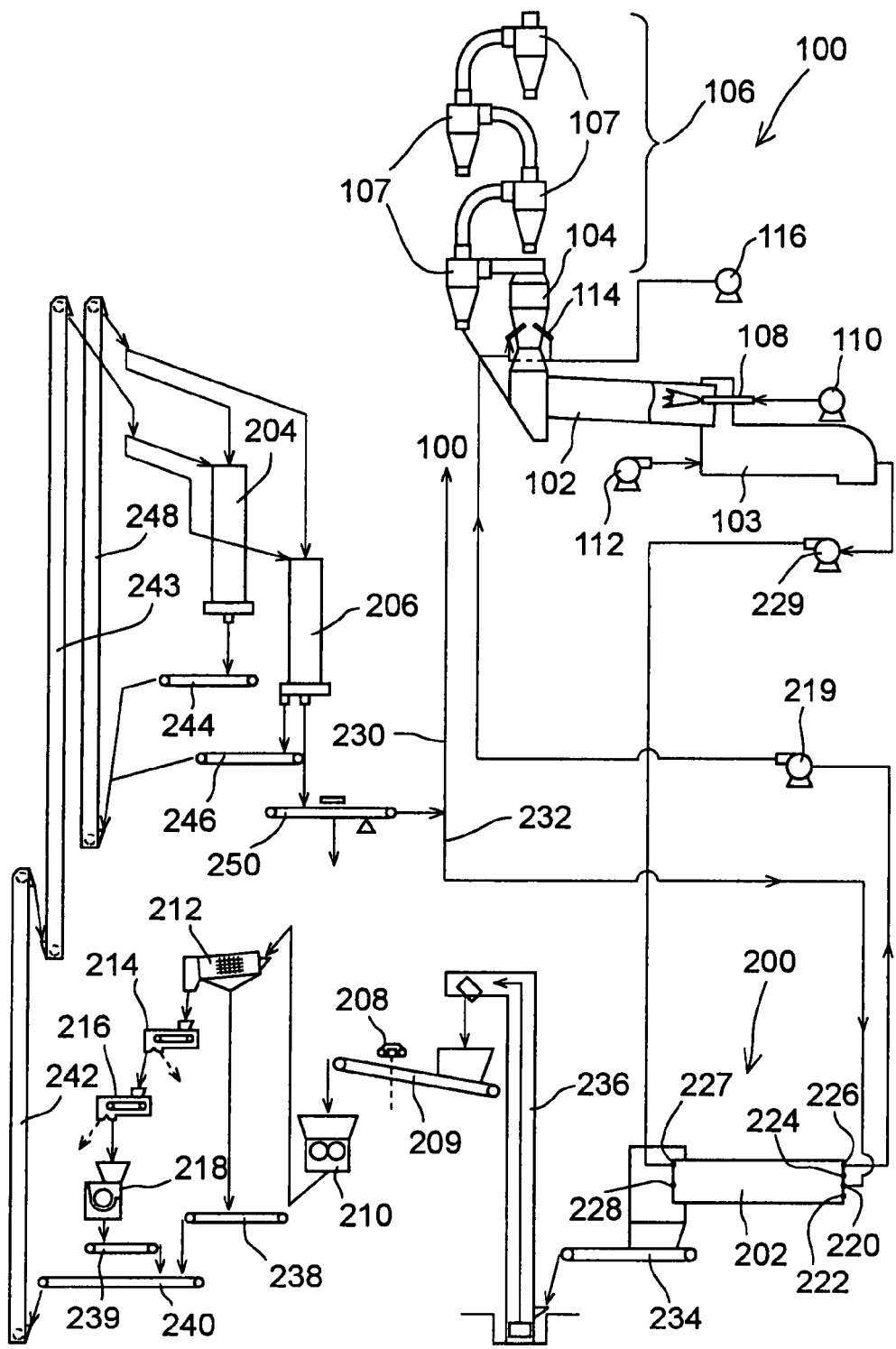
FIG. 1 is a schematic view illustrating one embodiment of a cement plant for carrying out the fermentation treatment process and cement production process in accordance with the present invention.

FIG. 1 schematically illustrates one embodiment of a cement plant for carrying out the fermentation treatment process and cement production process in accordance with the present invention.

In this cement plant, equipment for the manufacture of a raw material/fuel for cement production 200 in accordance with one embodiment of the present invention is installed in addition to cement production equipment 100.

Cement production equipment 100 include a rotary kiln (or cement kiln) 102, a clinker cooler 103, a calcining furnace 104 and a suspension preheater 106 as principal apparatus.

Rotary kiln 102 is equipped with a burner 108. This burner 108 is equipped with a blowing fan (not shown) for feeding a solid fuel such as a fermentation treatment product as will be described later, or pulverized coal; a feed pump 110 for feeding a liquid fuel such as heavy oil; and an air supply means such as an air blowing fan (not shown) for supplying air. In rotary kiln 102, a cylindrical drum is supported by supporting rollers (not shown) and can be rotated by a rotation means such as an electric motor (not shown). Rotary kiln 102 is installed in such a way that it is gently inclined downward from its inlet for a cement raw material (also referred to as a blended cement raw material) toward its cement clinker outlet. The cement raw material is collected by a cyclone 107 at the lowermost stage of the preheater and introduced into rotary kiln 102, where it is repeatedly raised and dropped while turning along a coating applied to a brick lining on the inner wall of rotary kiln 102. Thus, the cement raw material is fired by the radiant heat of a flame formed by burner 108.

Clinker cooler 103 is a means for cooling cement clinker discharged from rotary kiln 102. Clinker cooler 103 is divided into several compartments, in which the cement clinker is cooled with air supplied by a cooling fan 112 installed in the lower air chamber of each compartment.

Calcining furnace 104 is an apparatus for calcining the cement raw material, and is equipped with a burner 114 for calcining the cement raw material. This burner 114 is equipped with a blowing fan (not shown) for feeding a solid fuel such as a fermentation treatment product as will be described later, or pulverized coal; a feed pump 116 for feeding a liquid fuel such as heavy oil; and an air supply means such as an air blowing fan (not shown). By calcining the cement raw material, calcining furnace 104 enhances the degree of decarbonizing and reduces the heat load of rotary kiln 102, thus ensuring the firing of the cement raw material and contributing to the mechanical protection of rotary kiln 102 itself. At the same time, calcining furnace 104 utilizes waste heat from rotary kiln 102 effectively and thereby enhances the overall thermal efficiency of the cement plant.

Suspension preheater 106 is an apparatus for preheating the cement raw material, and consists of a plurality of cyclones 107 connected in series. The cement raw material is preheated by separating solid and gaseous components in each cyclone 107 and suspending the cement raw material in a gas stream within each duct to effect a heat exchange between the cement raw material and the gas.

On the other hand, equipment for the manufacture of a raw material/fuel for cement production 200 is equipment for carrying out the fermentation treatment (composting) of waste matter with a view to utilizing the waste matter effectively as a raw material/fuel for cement production, and includes a fermentation treatment apparatus 202 in accordance with one embodiment of the present invention, and storage and fermentation treatment tanks 204, 206. Moreover, this equipment for the manufacture of a raw material/fuel for cement production 200 is provided with foreign matter separation/removal apparatus 208-218 on the downstream side of fermentation treatment apparatus 202.

A rotary kiln out of operation (i.e., an idle kiln) is utilized as fermentation treatment apparatus 202. Similarly to the aforesaid rotary kiln 102, this fermentation treatment apparatus 202 comprises a cylindrical drum supported by supporting rollers (not shown) and can be rotated by a rotation means (not shown).

Generally, a rotary kiln used for the production of cement has an inner wall protected by a brick lining in order to maintain fire resistant properties during cement firing. However, in fermentation treatment apparatus 202 in accordance with this embodiment, the aforesaid brink lining is removed. When waste matter is introduced into fermentation treatment apparatus 202 and treated therein, the removal of the brick lining allows the waste matter to move easily and causes a significant reduction in the energy consumed for rotating the rotary kiln. Moreover, this makes it easy to install agitation devices and partition panels therein.

Fermentation treatment apparatus 202 is preferably such that the rotary kiln (or cement kiln) from which its brick lining has been removed has an inside diameter of 2 to 7 m and is installed with an incline of 1.0 to 6.0% and more preferably 1.2 to 1.6%.

Moreover, the outer periphery of fermentation treatment apparatus 202 is covered with a heat insulating material. This serves to maintain a proper temperature during the fermentation of a raw material for fermentation and thereby promote and equalize the fermentation. The part so covered is preferably the entire outer wall of fermentation treatment apparatus 202. For this purpose, it is preferable to use a heat insulating material having light weight and thermal insulating properties, such as rock wool or glass wool, and cover the outer wall of fermentation treatment apparatus 202 to an appropriate thickness.

The internal space of fermentation treatment apparatus 202 is divided into 4 or 5 compartments by partition panels. In a normal operational state, waste matter stays in fermentation treatment apparatus 202 for 3 days.

The aforesaid partition panels have a structure which can secure ventilation while intercepting the waste matter being treated, i.e., a ventilating structure such as a slit-bearing plate or a perforated plate.

Besides, various devices incorporated in conventional rotary kiln type fermentation apparatus, such as agitation devices, heating devices, and devices for moving the waste matter being treated, may be suitably installed according to need.

The inlet section of fermentation treatment apparatus 202 is separated from the existing suspension preheater. This inlet section is provided, for example, with an inlet port for city waste 220, an inlet port for sewage sludge 222, an inlet port for a returned fermentation treatment product 224, and a fermentation gas discharge port 226. This fermentation gas discharge port 226 is equipped with a ventilating fan 219 as an exhaust means so that the fermentation gas within fermentation treatment apparatus 202 may be withdrawn and sent to cement production equipment 100.

The outlet section of fermentation treatment apparatus 202 is separated from the existing clinker cooler and is provided with an outlet port for the fermentation treatment product 228. Moreover, this outlet section is also provided with an air inlet port 227 which is equipped with an air blowing fan 229 as an air supply means so that air may be supplied to fermentation treatment apparatus 202. Air blowing fan 229 is designed so that atmospheric air and cooler exhaust from clinker cooler 103 may be suitably mixed.

The inlet section and outlet section of fermentation treatment apparatus 202 may be the same as those of the original apparatus or may be reversed.

The aforesaid inlet ports 220, 222 and 224 at the inlet section of fermentation treatment apparatus 202 are closed except during the introduction of raw materials, and the aforesaid fermentation gas discharge port 226 and air inlet port 227 are also closed except during ventilation. Thus, fermentation treatment apparatus 202 basically has a closed construction.

In the aforesaid storage and fermentation treatment tanks 204, 206, the outer peripheries thereof are covered with a heat insulating material similar to that used for fermentation treatment apparatus 202. Its purpose is to maintain a proper temperature and thereby promote fermentation so that the fermentation having occurred in fermentation treatment apparatus 202 may proceed further. The part so covered is preferably the entire outer wall of each tank.

Moreover, these storage and fermentation treatment tanks 204, 206 are also equipped with an air supply means (not shown). Its purpose is to secure aerobic conditions and promote aging. From the viewpoint of composting, the fermentation in fermentation treatment apparatus 202 is a treatment known as the so-called primary fermentation. If the so-called secondary fermentation is completed by allowing fermentation to proceed further according to need, the product may be marketed as compost.

Storage and fermentation treatment tank 206 is equipped with a metering extractor. The fermentation treatment product withdrawn through the metering extractor may be fed both to a feed line 230 leading to cement production equipment 100 and to a return line 232 leading to fermentation treatment apparatus 202.

Apparatus 208-218 installed on the downstream side of fermentation treatment apparatus 202 are foreign matter separation/removal apparatus for freeing the fermentation treatment product of foreign matter (e.g., metals) that cannot be converted into compost and is useless as a raw material/fuel for cement production.

A magnetic separator 208 installed in the neighborhood of a belt conveyor 209 is an apparatus using a magnet to remove principally iron from the fermentation treatment product carried there by a belt conveyor 234 and a skip conveyor 236. Although only one magnetic separator 208 is installed in this embodiment, it may be designed as a multistage apparatus comprising two or more magnetic separators.

A primary crusher 210 is an apparatus for subjecting the resulting iron-free fermentation treatment product to primary crushing and thereby allowing it to be efficiently sieved by the succeeding trommel sieve 212.

Trommel sieve 212 is an apparatus for sieving the fermentation treatment product to separate a fraction thereof having an appropriate particle size and suitable for use as a raw material/fuel for cement production. The separated fermentation treatment product is transferred to a belt conveyor 240 by way of a belt conveyor 238.

A high-gauss separator 214 is an apparatus for receiving the fermentation treatment product containing stainless steel, aluminum and the like from trommel sieve 212. This apparatus serves to separate the fermentation treatment product into stainless steel and the remainder. The remainder is a fraction comprising aluminum and a raw material/fuel for cement production.

An aluminum separator 216 is an apparatus for separating the stainless steel-free fraction into aluminum and a fraction suitable for use as a raw material/fuel for cement production. Thus, such a fraction, which could not be recovered with trommel sieve 212, can be recovered at this stage. This fraction suitable for use as a raw material/fuel for cement production is fed to a secondary crusher 218.

Secondary crusher 218 is an apparatus for adjusting the fraction suitable for use as a raw material/fuel for cement production (that was not fully crushed by primary crusher 210) to an appropriate particle size. The resulting raw material/fuel for cement production is transferred to a belt conveyor 240 by way of a belt conveyor 239.

These foreign matter separation/removal apparatus located on the downstream side of fermentation treatment apparatus 202 should be installed in a building equipped with a suitable ventilation means so that an offensive smell from the fermentation treatment product and the like may not leak out to any appreciable extent.

Now, the effects obtained by carrying out the fermentation treatment process and cement production process of the present invention in a cement plant having the above-described construction according to this embodiment are specifically described below.

In this embodiment, a raw material/fuel for cement production is manufactured by the above-described equipment for the manufacture of a raw material/fuel for cement production 200 which is installed in the cement plant. Into fermentation treatment apparatus 202 of equipment for the manufacture of a raw material/fuel for cement production 200, city waste is introduced through inlet port for city waste 220.

The city waste so introduced preferably has a water content of 15 to 60% by weight, a combustibles content of 30 to 60% by weight, and an ash content of 3 to 30% by weight.

Before its introduction, the city waste is not pretreated, for example, by tearing the garbage bags. In addition to the city waste, sewage sludge is introduced through inlet port for sewage sludge 222.

The sewage sludge so introduced preferably has a water content of 50 to 90% by weight, a combustibles content of 6 to 35% by weight, and an ash content of 2 to 15% by weight.

The purpose of the concurrent introduction of city waste and sewage sludge is to achieve more efficient treatment of waste matter by treating city waste and sewage sludge at the same time, and to suitably regulate the water content of the raw material for fermentation with the aid of water contained in the sewage sludge and thereby maintain a good fermentation condition. Assuming that the proper water content for fermentation is between 45 and 60% by weight, the proportion of sewage sludge in the mixture is preferably in the range of 0 to 85% by weight. The proportions of combustibles and ash are preferably in the range of 10 to 60% by weight and 2 to 30% by weight, respectively.

If necessary, fertilizers (e.g., urea, ammonium sulfate and ammonium chloride), water, moisture regulators (e.g., rice straw, rice husks, sawdust, paper and wood chips), chopped rubber tires for the retention of spaces, and the like may be added. Fermentative bacteria may also be supplied by returning a portion of the fermentation treatment product to the raw material.

Moreover, in this embodiment, a portion of the fermentation treatment product is withdrawn from storage and fermentation treatment tank 206 and returned to fermentation treatment apparatus 202 through line 232. Its purpose is to stabilize the bacteria present in fermentation treatment apparatus 202 and to stabilize the quality of the fermentation treatment product.

Of the 4 or 5 compartments formed in fermentation treatment apparatus 202, waste matter is first introduced into the compartment closest to its inlet section. Although the compartments are separated by partition panels, the waste matter moves from compartment to compartment through openings formed in the partition panels. After the lapse of 3 days, the resulting fermentation treatment product is withdrawn from outlet port 228. As described previously, since fermentation treatment apparatus 202 is installed with an incline of 1.0 to 6.0%, the waste matter under fermentation treatment can be easily moved by its rotation. For example, when fermentation treatment apparatus 202 from which its brick lining has been removed has an inside diameter of 4 to 5 m, it is preferably rotated at a speed of 0.5 to 3.0 rpm throughout the fermentation treatment period.

In the compartments located on the inlet section side, fermentative bacteria (e.g., thermophilic bacteria, common bacteria and actinomycetes) occurring anywhere in nature cause the fermentation (composting) of waste matter to proceed by a mechanism such as the aerobic decomposition of easily decomposable components. As a result, the temperature of the introduced raw material may sometimes reach 70° C. within 24 hours. Thus, in fermentation treatment apparatus 202, the raw material comprising waste matter undergoes a fermentation step commonly referred to as "primary fermentation" until it comes to completion. That is, under aerobic conditions, unstable organic materials (i.e., carbohydrates, proteins, etc.) are converted into stable substances which give off little offensive smell and have a long storage life.

The temperatures of the aforesaid compartments are monitored with suitable temperature sensors. Thus, the temperature within fermentation treatment apparatus 202 can be suitably regulated by controlling the temperature of air supplied by the air supply means, the proportion of different types of waste matter introduced, and other parameters in response to the monitored temperatures.

Since fermentation treatment apparatus 202 is rotated at the aforesaid rotational speed during fermentation treatment, the bags (e.g., garbage bags containing city waste) are spontaneously broken and do not interfere with the fermentation treatment. These garbage bags and the like are repeatedly raised and dropped as a result of the rotation of fermentation treatment apparatus 202, so that most of them are broken in the first compartment.

On the other hand, during fermentation treatment, the fermentation gas produced in fermentation treatment apparatus 202 is withdrawn from fermentation gas discharge port by means of ventilating fan 219, conducted through a pipeline, and introduced, for example, into calcining furnace 104 of cement production equipment 100. Thus, ammonia and other gases produced in the fermentation process are decomposed and the exhaust gas is deodorized. Moreover, air is supplied through air inlet port 227 formed on the side of the fermentation treatment product outlet by means of air blowing fan 229, so that aerobic conditions are maintained in fermentation treatment apparatus 202. Thus, fermentation by aerobic bacteria can be maintained. As described previously, air blowing fan 229 is designed so that atmospheric air and cooler exhaust from clinker cooler 103 may be suitably mixed. Consequently, the temperature of supplied air can be suitably controlled. If waste matter is exposed to a temperature of 50° C. or above for 1 day, various types of harmful bacteria are destroyed or inactivated and the waste matter becomes safe from a hygienic point of view. On the other hand, the rate of fermentation by aerobic bacteria is highest at a temperature of about 60° C. With consideration for these facts, it may be said that the temperature should preferably be controlled so as to be in the range of about 55 to 60° C. The temperature of supplied air can be suitably controlled by regulating the proportion of cooler exhaust added according to the temperature of the atmosphere. Alternatively, air may be supplied after it is preheated with various types of waste heat generated in the cement production equipment.

After 3 days of fermentation as described above, the resulting fermentation treatment product should have the following preferred properties.

Number of coliform bacteria (hygienic indicator microorganisms): Not greater than 103 colonies per gram [as determined according to the Testing Method for Industrial Waste Water (Test for Bacteria) described in JIS K0102-1993].

This is an indicator of the absence of harmful bacteria such as typhoid bacilli and salmonellae. The absence of such harmful bacteria can be confirmed by satisfying this requirement.

Particle size distribution of organic waste matter: Not less than 90% (by weight) of particles having a size of 20 mm or less.

For use as a raw material/fuel for cement production, the fermentation treatment product should preferably satisfy this particle size distribution requirement.

The composition of the fermentation treatment product preferably is adjusted to a water content of 40 to 60% by weight, a combustibles content of 10 to 55% by weight, and an ash content of 4 to 20% by weight. Its calorific value preferably is not less than 1,500 kcal/kg (on a dry basis).

The fermentation treatment product satisfying these requirements may be directly introduced into the inlet port and used as a raw material/fuel for cement production, without subject it to any further treatment.

The fermentation treatment product obtained in the above-described manner is freed of iron, stainless steel and aluminum by means of magnetic separator 208, high-gauss separator 214 and aluminum separator 216. The separated metals may be reused as resources.

Moreover, the fermentation treatment product is adjusted to an appropriate particle size by means of primary crusher 210 and secondary crusher 218. The use of such multistage crushers permits the fermentation treatment product to have a quality suitable for use as a raw material/fuel for cement production. In the present invention, plastics waste is not removed from the fermentation treatment product. The reason for this is that it is intended to utilize such plastics waste directly as a part of the raw material/fuel for cement production. Plastics waste is also cut to pieces of appropriate size by means of primary crusher 210 and secondary crusher 218.

The fermentation treatment product recovered on belt conveyor 240 is transferred to storage and fermentation treatment tanks 204, 206 as a raw material/fuel for cement production.

In this embodiment, the fermentation treatment product is transferred to cylindrical type storage and fermentation treatment tanks 204, 206 by means of bucket elevators 242, 243. The fermentation treatment product introduced into these storage and fermentation treatment tanks 204, 206 is circulated through a circulation system.

Specifically, belt conveyors 244, 246 are installed beneath tanks 204, 206, onto which a portion of the fermentation treatment product is withdrawn. This fermentation treatment product is vertically conveyed by means of a bucket elevator 248 and introduced again into storage and fermentation treatment tanks 204, 206.

Thus, aerobic conditions can be maintained, and this mixing operation can homogenize the fermentation treatment product for use as a raw material/fuel for cement production.

The resulting fermentation treatment product conveyed by belt conveyor 250, fed through line 230 to cement production equipment 100, and used as a raw material/fuel for cement production. Alternatively, a portion thereof is returned to fermentation treatment apparatus 202 by way of line 230.

On the other hand, the treatment of a cement raw material is carried out in the aforesaid cement production equipment 100, concurrently with the operation of equipment for the manufacture of a raw material/fuel for cement production 200. Specifically, the cement raw material is preheated in several cyclones 107 of suspension preheater 106, calcined in calcining furnace 104, and fired in rotary kiln 102.

In this embodiment, the resulting raw material/fuel for cement production is withdrawn from storage and fermentation treatment tank 206, fed through line 230 to the upstream end of rotary kiln 102 or calcining furnace 104, and used as a fuel for firing in rotary kiln 102 or as a fuel for calcining in calcining furnace 104. Moreover, fermentation gas from fermentation treatment apparatus 202 is introduced into calcining furnace 104 (or rotary kiln 102) and deodorized at high temperatures. This deodorizing operation also produces a denitrifying effect. Air from the building housing the foreign matter separation/removal apparatus may also be deodorized in the same manner.

Other Embodiments

Although the fermentation treatment process, cement production process, raw material/fuel for cement production, fuel for electric power generation, fermentation treatment apparatus, equipment for the manufacture of a raw material/fuel for cement production, and cement plant in accordance with the present invention have been described above in connection with the embodiment illustrated in FIG. 1, it is to be understood that the present invention is not limited to this embodiment, but all such modifications, variations and additions as will be obvious to those skilled in the art fall within the technical scope of the present invention.

For example, although city waste is treated in the above-described embodiment, it is a matter of course that the present invention can be practiced for other types of organic waste matter capable of being converted into compost.

Although a rotary kiln (or cement kiln) is used as the fermentation treatment apparatus in the above-described embodiment, a rotary dryer for cement production may also be used.

In the production of cement, this rotary dryer is used for drying the raw material.

Figure 2:
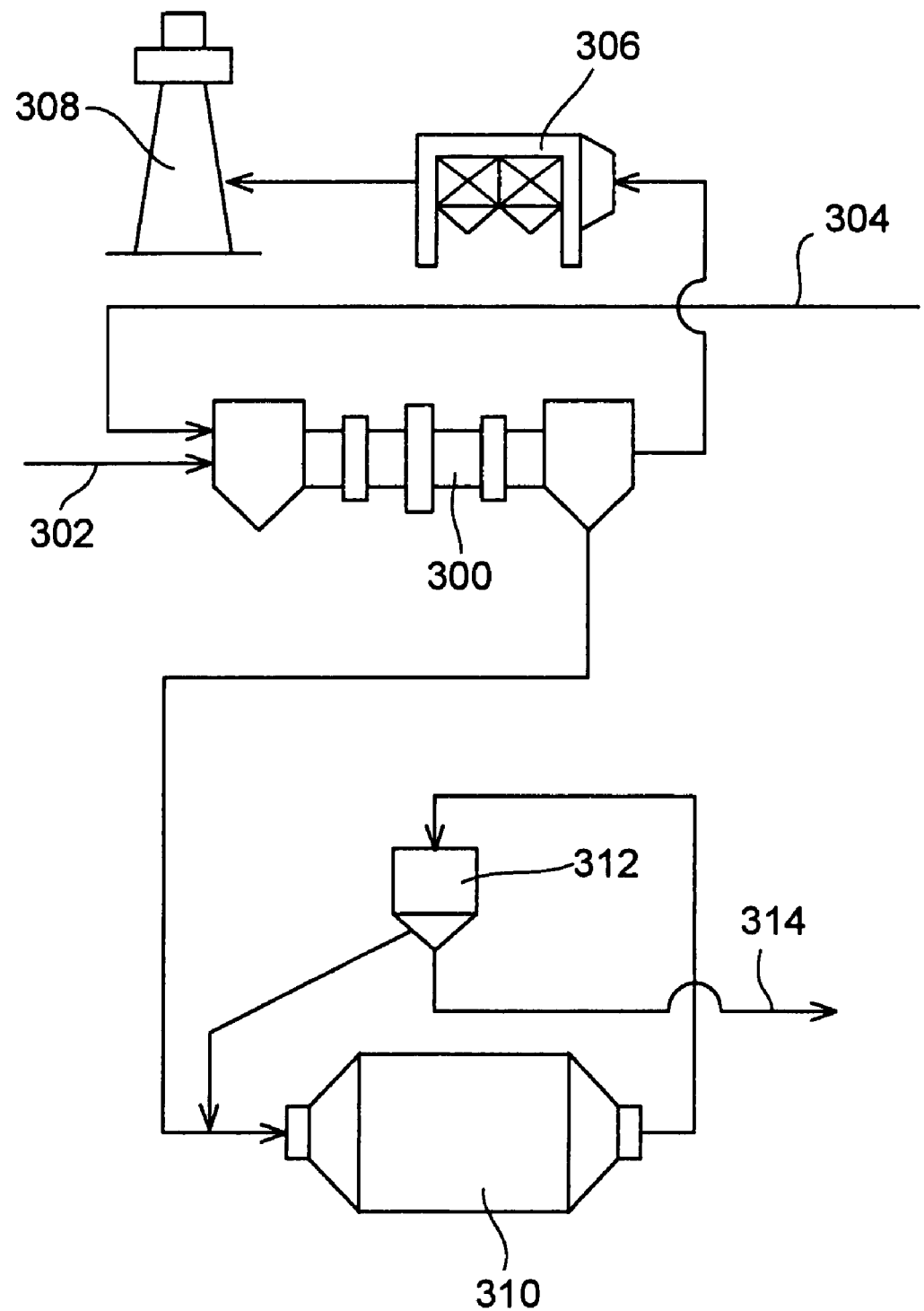
FIG. 2 is a schematic view illustrating a part of a cement plant and serving to explain a rotary dryer for cement production.

FIG. 2 illustrates a part of a cement plant in accordance with another embodiment in which a rotary dryer is used.

A rotary dryer 300 is used to dry a cement raw material (comprising limestone, clay and the like) fed through a feed line 302. This drying is carried out by use of the waste heat possessed by exhaust gas discharged from a rotary kiln or the like and supplied through a supply line 304. Exhaust gas from rotary dryer 300 is dedusted with an electrostatic precipitator 306 and discharged from a stack 308. After the dried raw material is crushed with a raw material crusher 310, a fraction having a predetermined particle size is separated with a separator 312 and fed through a line 314 to the succeeding homogenization, preheating, calcining and firing steps.

Similarly to a cement kiln (or rotary kiln), such a rotary dryer 300 can also be used if it is lying idle. If necessary, both of them may be used in combination. This rotary dryer may also be used in the same manner as the aforesaid fermentation treatment apparatus 202.

In the aforesaid fermentation treatment apparatus 202, the inlet and outlet of the rotary kiln are the same as when it is used for the production of cement. However, this arrangement is not always necessary, and the rotary kiln or rotary dryer may be used by reversing its inlet and outlet. In such a case, the rotary kiln or rotary dryer must be inclined in the reverse way.

The aforesaid fermentation treatment apparatus 202 is divided into 4 or 5 compartments and the fermentation treatment is carried out for 3 days. However, it is to be understood that the manner of division is not limited thereto. If circumstances require, the fermentation treatment apparatus may be divided into a smaller number (3 or less) of compartments or a larger number (6 or more) of compartments. Moreover, it is to be understood that the fermentation treatment period is not limited to 3 days. If harmful microorganisms can be destroyed, the fermentation treatment period may be less than 3 days. If the fermentation treatment product is to be used as a raw material/fuel for cement production, it will be sufficient that the so-called primary fermentation is completed, because complete composting is not required. If complete composting is desired, the fermentation treatment product may be aged in storage and the fermentation treatment tanks as described previously.

Although two storage and the fermentation treatment tanks 204, 206 are used in the above-described embodiment, a larger number of such tanks may be used. Moreover, although these tanks 204, 206 have a cylindrical shape so as to facilitate the withdrawal of their contents, they may also have a divergent shape. This makes it easier to withdraw their contents. Besides, the preheater equipment attached to the cement kiln may be used as storage tanks. The preheater equipment includes a calcining furnace, cyclones, ducts and the like. When used as storage tanks, it is preferable that this preheater equipment be suitably modified, for example, by removing the brick lining therefrom.

In the embodiment described with reference to FIG. 1, a portion of the fermentation treatment product to fermentation treatment apparatus 202. However, it is not always necessary to return the fermentation treatment product.

Similarly to fermentation gas from fermentation treatment apparatus 202, fermentation gas from storage and the fermentation treatment tanks 204, 206 may be returned to cement production equipment 100 and used as a denitrifying agent, though this is not practiced in the embodiment described with reference to FIG. 1. In this case, storage and the fermentation treatment tanks 204, 206 need to be equipped with an exhaust means.

Moreover, the fermentation treatment product may be introduced into the step of preparing a blended cement raw material, and used as a part of the blended cement raw material, though this is not practiced in the embodiment described with reference to FIG. 1.

The inlet site for introducing the resulting fermentation treatment product into the firing step of cement production is not limited to the above-described embodiment, but the fermentation treatment product may be introduced into any of the inlet ports of the preheater equipment and the firing equipment (e.g., cement kiln).

Similarly, the inlet site for introducing the gas produced in the fermentation treatment process is not limited to the above-described embodiment, but the gas may be introduced into any of the inlet ports of the preheater equipment and firing equipment (e.g., cement kiln) which are used in the firing step of cement production.

As described above, the fermentation treatment product obtained by the above-described fermentation treatment may be used as a raw material/fuel for cement production. In addition, this fermentation treatment product may also be used as a fuel for electric power generation because of its high calorific value (equal to about ½-⅔ of that of coal).

EXAMPLE 1

The fermentation treatment of city waste was carried out by using a fermentation treatment apparatus as illustrated in FIG. 1.

The city waste had a water content of 21% by weight, a combustibles content of 52% by weight, and an ash content of 20% by weight. This city waste was introduced into the fermentation treatment apparatus, together with sewage sludge having a water content of 80% by weight, a combustibles content of 16% by weight, and an ash content of 4% by weight. The city waste and the sewage sludge were introduced in a weight ratio of 2:1. The city waste was directly introduced without tearing the garbage bags.

The fermentation treatment was carried out for 3 days. Fermentation treatment apparatus 202, from which its brick lining had been removed, had an inside diameter of 5 m and was rotated at a speed of 1.0 rpm. Since the fermentation treatment apparatus was rotated at this rotational speed during fermentation treatment, the bags (e.g., garbage bags containing city waste) were spontaneously broken and did not interfere with the fermentation treatment. Most of these garbage bags and like bags were broken in the first compartment of the fermentation treatment compartment.

After the removal of large masses, the fermentation treatment product was passed through a sieve having an opening size of 10 mm. A fraction having passed through the sieve was used as a sample for analysis.

10 g of the sample was suspended in 100 mL of physiological saline, and stirred and dispersed with a stirrer for 30 minutes. Thus, microorganisms present in the sample were liberated into the physiological saline. The number of coliform bacteria (hygienic indicator microorganisms) was not greater than 103 colonies per gram [as determined according to the Testing Method for Industrial Waste Water (Test for Bacteria) described in JIS K0102-1993].

Moreover, the (wet) weights of the fraction having passed through the sieve and the fraction remaining thereon were measured, and the proportion of biodegradable organic matter having a size of not greater than 10 mm was calculated as a weight percentage (on a wet weight basis). As a result, the proportion of biodegradable organic matter having a size of not greater than 10 mm was not less than 90% (by weight).

The composition of the fermentation treatment product could be adjusted to a water content of 50% by weight, a combustibles content of 45% by weight, and an ash content of 5% by weight. Its calorific value was 3,000 kcal/kg (on a dry basis).

Thus, a fermentation treatment product meeting the above-described specifications could be obtained. Consequently, it has been found that the present invention can yield a final product useful as a raw material/fuel for cement production and as a fuel for electric power generation.

Many other variations and modifications of the invention will be apparent to those skilled in the art without departing from the spirit and scope of the invention. The above-described embodiments are, therefore, intended to merely exemplary, and all such variations and modifications are intended to be included within the scope of the invention as defined in the appended claims.

The disclosure of Japanese Patent Application No. 11-308030 filed on Oct. 29, 1999 including specification, claims, drawings and summary are incorporated herein by reference in its entirety.

The disclosure of Japanese Patent Application No. 11-311822 filed on Nov. 2, 1999 including specification, claims, drawings and summary are incorporated herein by reference in its entirety.

The disclosure of Japanese Patent Application No. 2000-252044 filed on Aug. 23, 2000 including specification, claims, drawings and summary are incorporated herein by reference in its entirety.

The disclosure of Japanese Patent Application No. 2000-252045 filed on Aug. 23, 2000 including specification, claims, drawings and summary are incorporated herein by reference in its entirety.

What is claimed is:

1. A fermentation treatment apparatus for the fermentation treatment of waste matter, said apparatus comprising:
   a rotary kiln from which its brick lining has been removed, or a rotary dryer; and
   fermentative bacteria present in an amount sufficient for the fermentation treatment of waste matter in said rotary kiln or rotary dryer.

2. A fermentation treatment apparatus for the fermentation treatment of waste matter, said apparatus comprising a cement kiln from which its brick lining has been removed, or a rotary dryer for cement production; and
   fermentative bacteria present in an amount sufficient for the fermentation treatment of waste matter in said rotary kiln or rotary dryer.

3. A fermentation treatment apparatus as claimed in claim 1 wherein at least a part of the outer surface of said rotary kiln or rotary dryer is covered with a heat insulating material.

4. A fermentation treatment apparatus as claimed in claim 2 wherein at least a part of the outer surface of said cement kiln or rotary dryer for cement production is covered with a heat insulating material.

* * * * *